(12) United States Patent  (10) Patent No.: US 6,557,431 B2
Pawlak  (45) Date of Patent: May 6, 2003

(54) FAIL-SAFE BALL SCREW (75) Inventor: John Thomas Pawlak, Lombard, IL (US)

(73) Assignee: Siemens Medical Solutions USA, Inc., Iselin, NJ (US)

( * ) Notice: Subject to any disclaimer, the term of this patent is extended or adjusted under 35 U.S.C. 154(b) by 25 days.

(21) Appl. No.: 09/773,821

(22) Filed: Feb. 2, 2001

(65) Prior Publication Data

US 2002/0104398 A1 Aug. 8, 2002

(51) Int. Cl.[7] ............................................. F16H 25/22
(52) U.S. Cl. ........................ 74/424.75; 74/424.83; 192/150; 254/98
(58) Field of Search ........................ 74/424.75, 424.82, 74/424.83; 192/150; 254/92, 98

(56) References Cited

U.S. PATENT DOCUMENTS

| | | | | |
|---|---|---|---|---|
| 610,044 A | * | 8/1898 | Glenn | 254/98 |
| 2,069,471 A | * | 2/1937 | Baker | 74/424.9 |
| 2,855,790 A | * | 10/1958 | Smith | 74/424.75 |
| 3,304,794 A | * | 2/1967 | Bird | 74/409 |
| 3,468,401 A | * | 9/1969 | Letz | 187/268 |
| 3,687,234 A | * | 8/1972 | Gendreau | 187/210 |
| 4,962,674 A | * | 10/1990 | Payne | 187/267 |
| 5,295,406 A | * | 3/1994 | Alfano | 74/89.39 |
| 6,206,784 B1 | * | 3/2001 | Kato | 384/516 |

* cited by examiner

Primary Examiner—David Fenstermacher (57) ABSTRACT

A fail-safe ball screw assembly has a double-start screw and a corresponding nut. The screw has a first helix with a truncated, smaller diameter flat and an intertwined second helix with an extended, larger diameter flat. Similarly, the corresponding nut has a first helix with an extended, larger diameter flat and an intertwined second helix with a truncated, smaller diameter flat. When the screw is inserted with the nut, the screw's truncated first helix is paired with the nut's extended first helix, and the screw's extended second helix is paired with the nut's truncated second helix. The nut and screw helixes combine to form channels in which bearings balls travel. The bearings allow the fail-safe ball screw assembly to operate with high efficiency and precision, while the overlapping structure of the helixes prevents catastrophic failure caused by the removal or loss of the bearing balls. In particular, the extended, larger diameter flats of second screw helix and the first nut helix interact, similar to commonly threaded screws, to prevent the unintended separation of the screw and nut. Another implementation of the present invention connects a torque sensor to the ball screw assembly to detect deterioration.

13 Claims, 11 Drawing Sheets

FAIL-SAFE BALL SCREW

FIELD OF THE INVENTION

The present invention relates to a fastening structure having a screw with outer helical grooves, an associated nut with corresponding inner helical grooves, and bearing balls interposed in the nut and screw grooves, where the screw and nut remain engaged even after loss or removal of the bearing balls.

BACKGROUND OF THE INVENTION

Figure 1A:
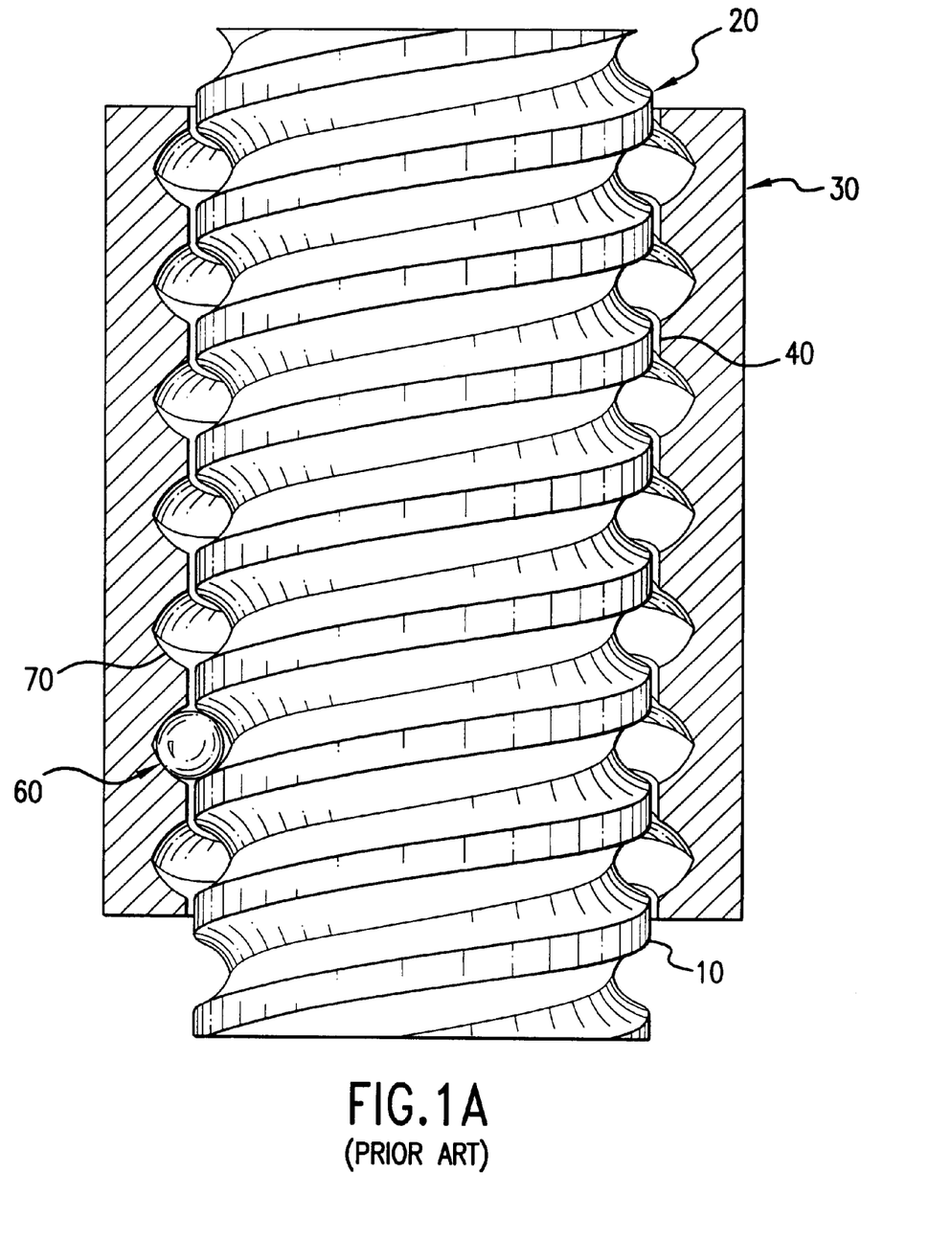
FIGS. 1A–1D (PRIOR ART) are diagrams of a ball screw assembly in which the nut is shown in cross-section.
Figure 1B:
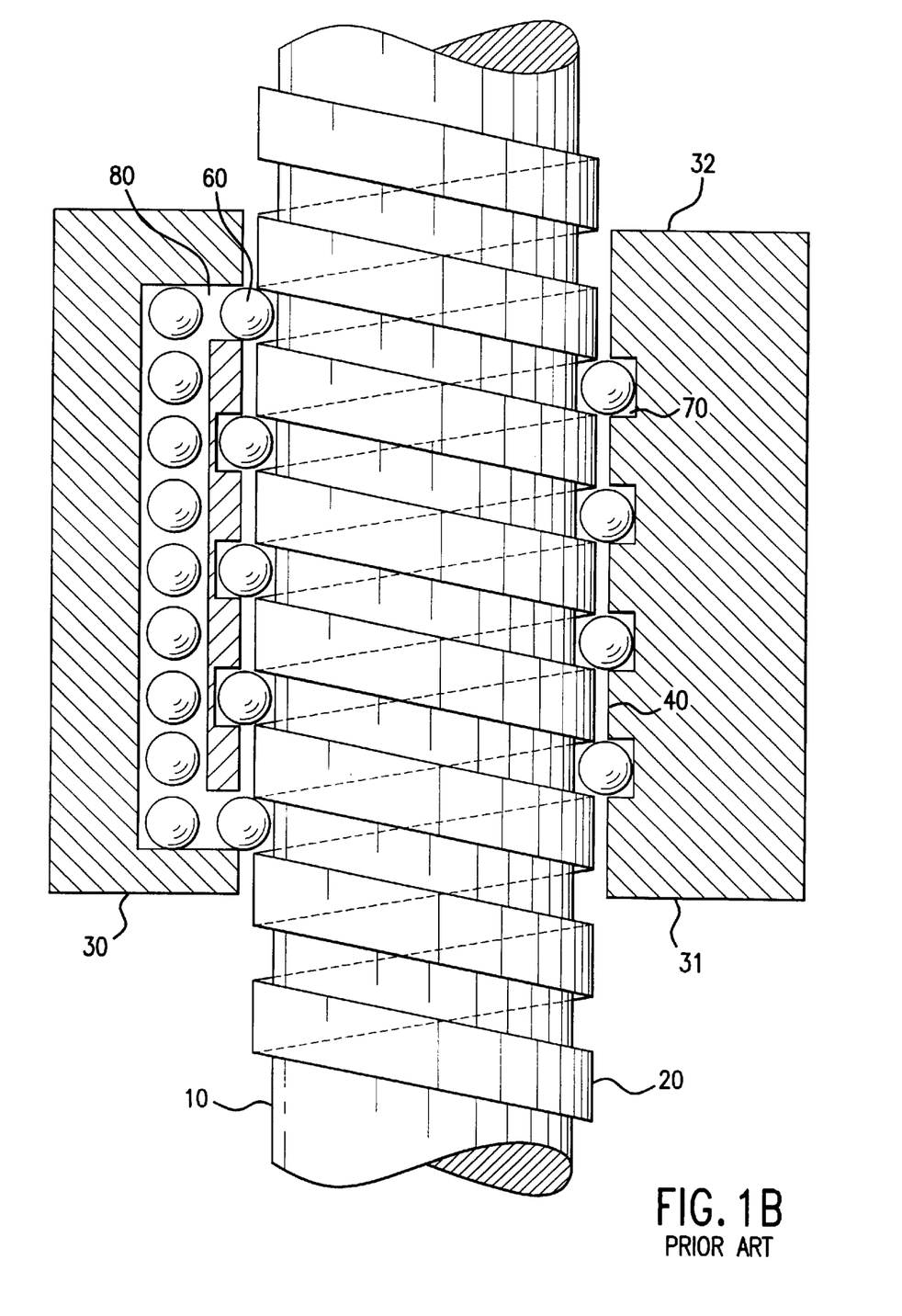
Figure 1C:
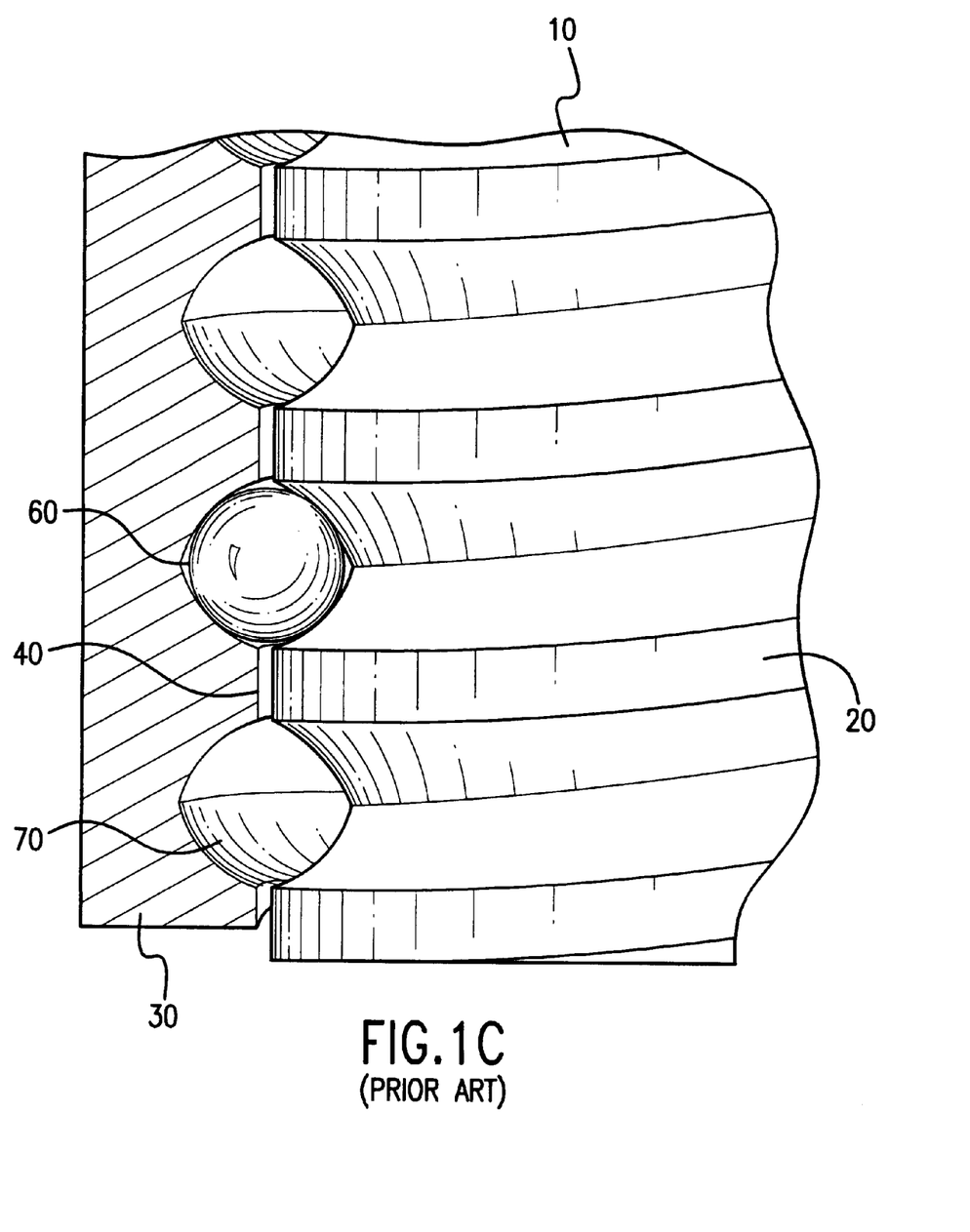

A ball screw assembly is a relatively well known mechanism for converting rotary motion into axial movement, as disclosed in U.S. Pat. No. 1,831,080. As illustrated in FIGS. 1A–1C, a standard ball assembly has a screw 10 with a thread 20, a nut 30 positioned around the screw and internally threaded with a thread 40 having the same pitch as the screw thread 20, and a multitude of bearings 60 disposed in a channel 70 defined between the screw 10 and nut 30 by the screw and nut threads 20 and 40. The channel 70 may be shaped to match closely the shape and dimensions of the bearings 60. The ball screw assembly further includes a return tube 80 in the nut 30 for transferring the bearings 60 between the opposite ends of the nut. In operation of the ball nut assembly, counter-clockwise rotation of the screw causes the bearings 60 to leave the channel 70 at a distal end 31 of the nut 30 and travel via the return tube 80 to the proximal end 32 nut where the bearings 60 are returned into the channel 70. In order to direct the cycling of the bearings 60, the nut may have a structure, such as a finger (not illustrated) that extends into the channel 70 to direct the bearings 60 in to the return tube 80.

The structure of the ball screw assembly allows rotation of the screw 10 relative to the nut 30 to cause precise axial motion of the screw 10 relative to the nut 30. The ball screw assembly has very high mechanical efficiencies and can bear large loads, which make it possible to obtain very high yields and to shift heavy loads using a very low torque input. Because of these properties, the ball screw assembly is frequently employed in moving and manipulating heavy loads. In addition, the ball screw assembly is wear resistant and exhibit very little play. Accordingly, the ball screw assembly is also well-suited for use in precision mechanisms and machine tools employed in commercial, manufacturing, and industrial applications.

Figure 2:
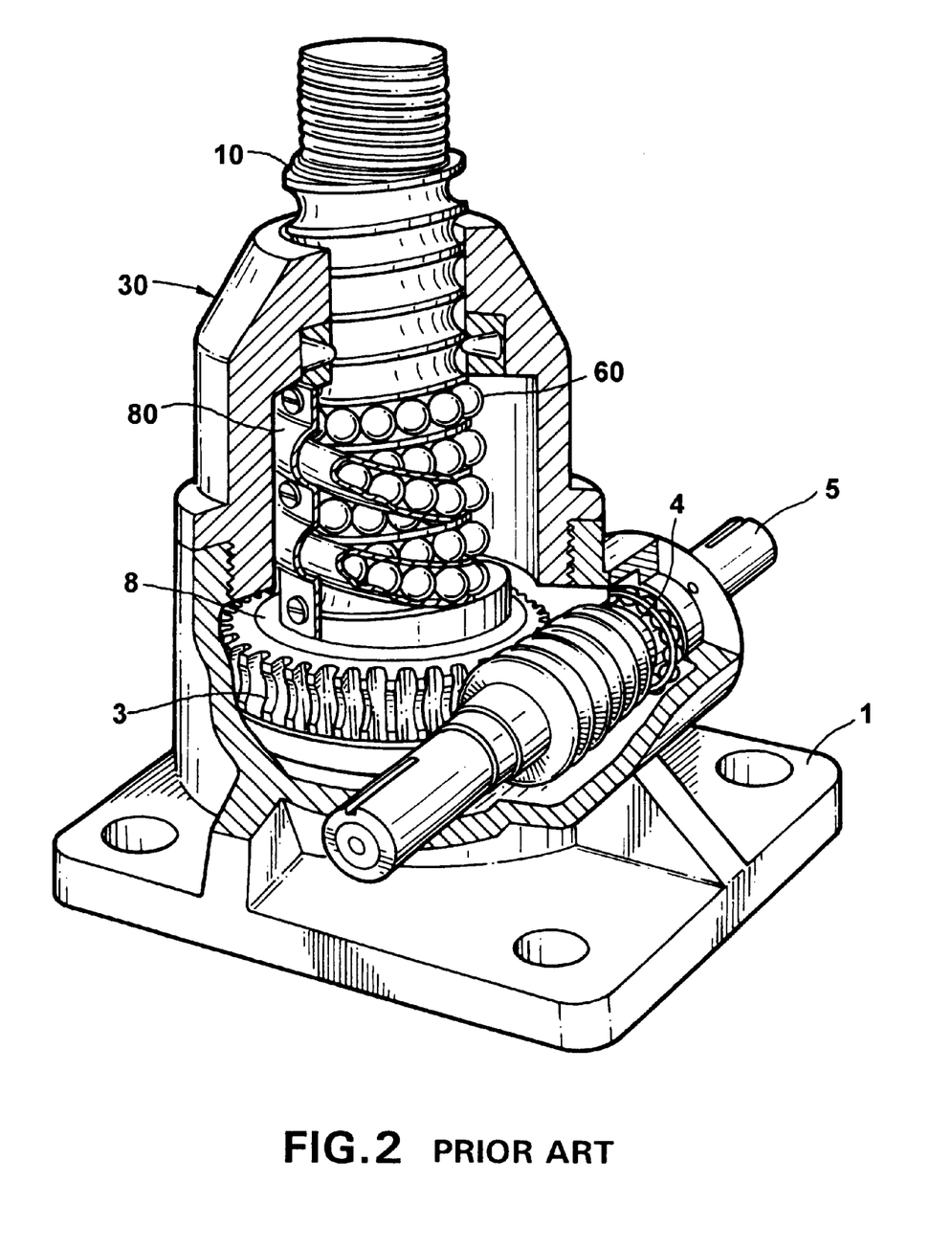
FIG. 2 (PRIOR ART) is an illustration of a typical mechanical system to rotate the ball screw assembly of FIGS 1A–1C.

A well-known apparatus for mechanically rotating the ball screw assembly is illustrated in FIG. 2. In that figure, a housing, generally designated 1, is provided for the ball screw 10 which is extensible from the housing 1. Received on the ball screw 10, is the nut 30, which circulates the bearings 60 in a recirculating path in the usual, above-described manner. The nut 30 may be driven in rotation by a pinion gear 3 via a worm gear 4 which is in mesh with it. The worm gear shaft 5 may be driven by a motor drive system (not shown). Provided on the nut 30 is an integrated base flange 8 which is received within and coupled to the pinion gear 3.

In operation, rotation of the worm shaft 5 drives the nut 30 in rotation via the worm 4 and pinion 3. With rotation of the ball nut 30, the bearings 60, which travel in the complemental internal threads 40 and external threads 20 of the nut 30 and ball screw 10 respectively, move the screw 10 in axial motion up and down as desired.

Unfortunately, the traditional ball screw assembly has the problem of occasional catastrophic failure. In particular, the balls 60 start to fatigue and deteriorate when used for many cycles, depositing debris in the channel 70 and the return tube 80. This presence of the debris causes the bearings 60 to deteriorate even further. Eventually, the bearings 60 may become so worn and distorted that they are no longer able to prevent separation of the screw 10 from the nut 30. Alternatively, the debris from the deterioration of the bearings 60 collects and blocks the return tube 80, such that the bearings 60 leave the ball screw assembly instead of returning the beginning of the channel 70.

Figure 1D:
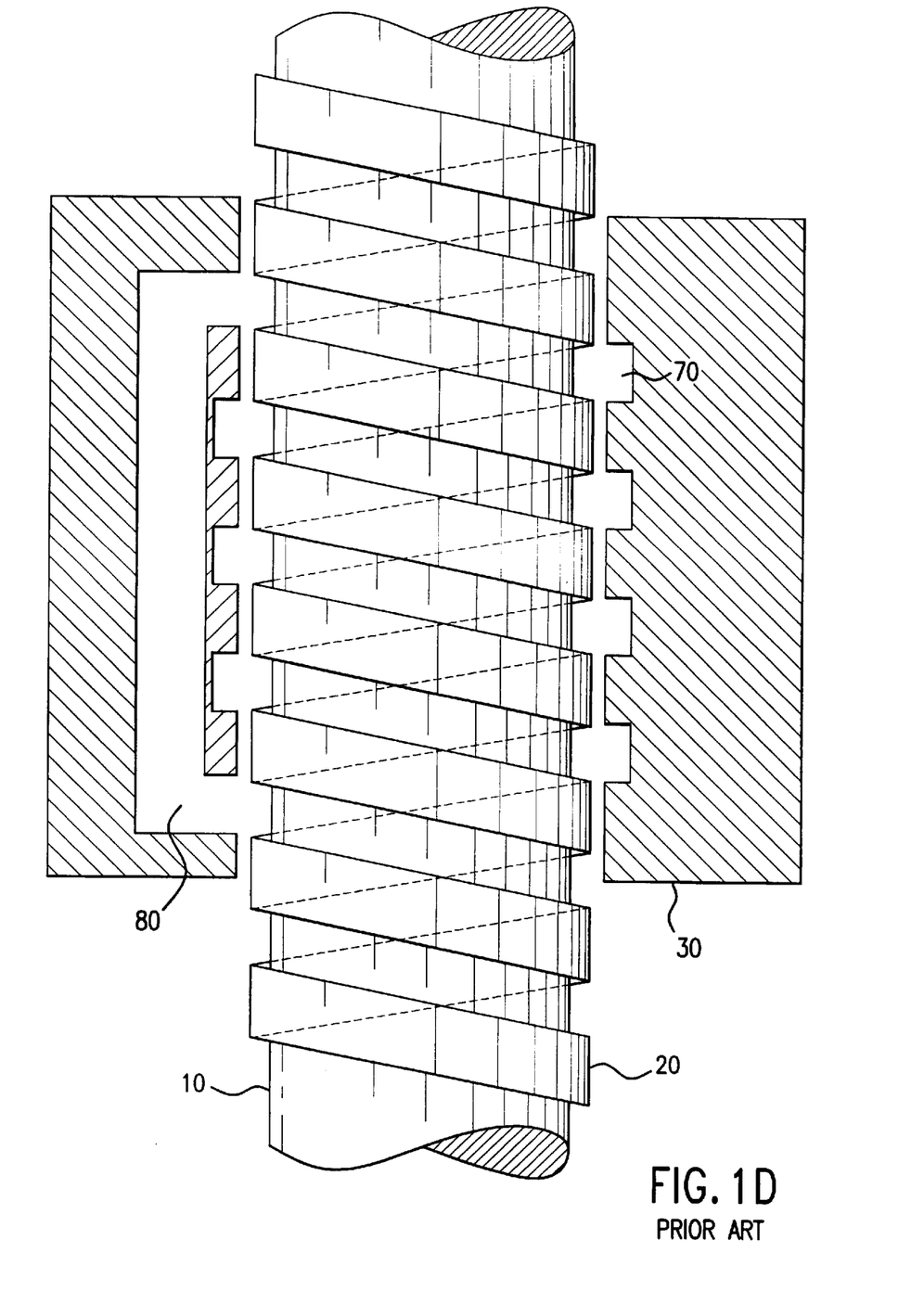

In either case, catastrophic failure occurs as the screw 10 separates from the nut 30 with little resistance. As seen in FIG. 1D, the traditional ball screw assembly has no structural feature to prevent the screw 10 from easily separating from the nut 30 after the bearings 60 are removed from the channel 70. The screw and nut may violently separate, causing the load supported by the ball screw assembly to be abruptly released and dropped, potentially damaging the contents of the load. This failure of the ball screw assembly is sudden and without warning, potentially occurring almost immediately upon the loss of the bearings 60.

Accordingly, it is a goal of the present invention to provide an improved ball screw assembly that is resistant to catastrophic failure and the resulting sudden separation while preserving the ball screw's benefits of high mechanical efficiencies. A further goal of the present invention to provide a ball screw assembly that gives an indication of potential failure, thereby allowing preventive measures such as repair or replacement of the ball-screw assembly.

SUMMARY OF THE INVENTION

These and other goals are addressed through the fail-safe ball screw assembly of the present invention. The ball screw assembly has a double start screw with a first helix with a truncated, smaller diameter flat and an intertwined second helix with an extended, larger diameter flat. The assembly also has corresponding nut with a first helix with an extended, larger diameter flat and an intertwined second helix with a truncated, smaller diameter flat. When the screw is inserted with the nut, the screw's truncated first helix is paired with the nut's extended first helix. Likewise, the screw's extended second helix is paired with the nut's truncated second helix. The nut and screw helixes combine to form channels in which bearings balls travel. With this structure, the fail-safe ball screw assembly operates with the efficiency and precision of a standard ball screw, while catastrophic failure caused by the removal or loss of the bearing balls is prevented. In particular, the extended, larger diameter flats of the second screw helix and the first nut helix interact, similar to threads in standard screw/nut combinations, to prevent the unintended separation of the screw and nut. When contact occurs between the larger diameter flats of the second screw helix and the first nut helix, the resulting friction diminishes the ball screw assembly's efficiency, thereby requiring more energy to rotate the ball screw relative to the nut. To take advantage of this indication of deterioration and failure of the ball screw assembly, another implementation of the present invention connects a torque sensor to the ball screw assembly to detect any increase in force needed to turn the ball screw.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 3A:
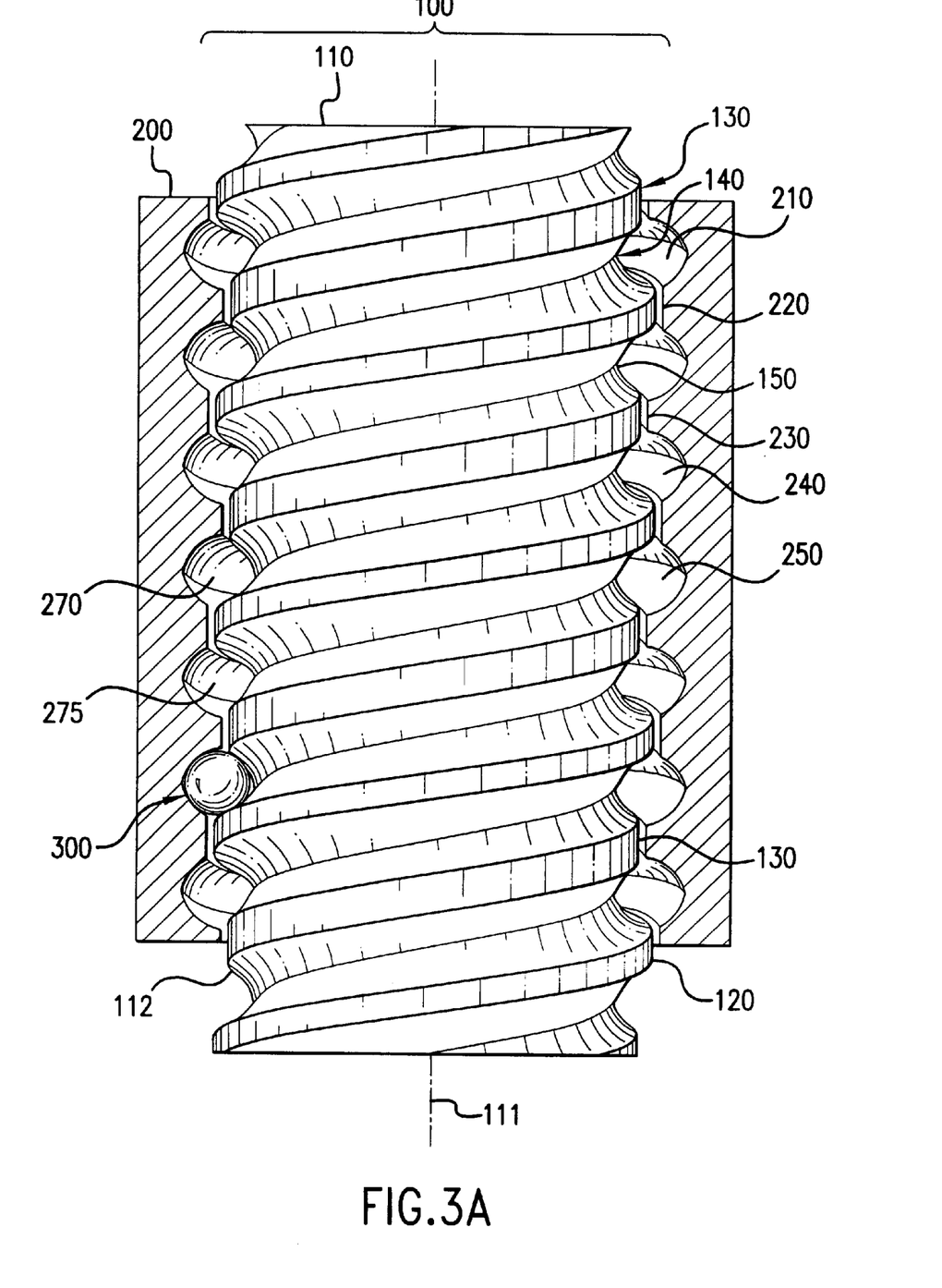
FIGS. 3A–3E are diagrams of a fail-safe ball screw assembly with the nut shown in cross-section, in accordance with an embodiment of the present invention.
Figure 3B:
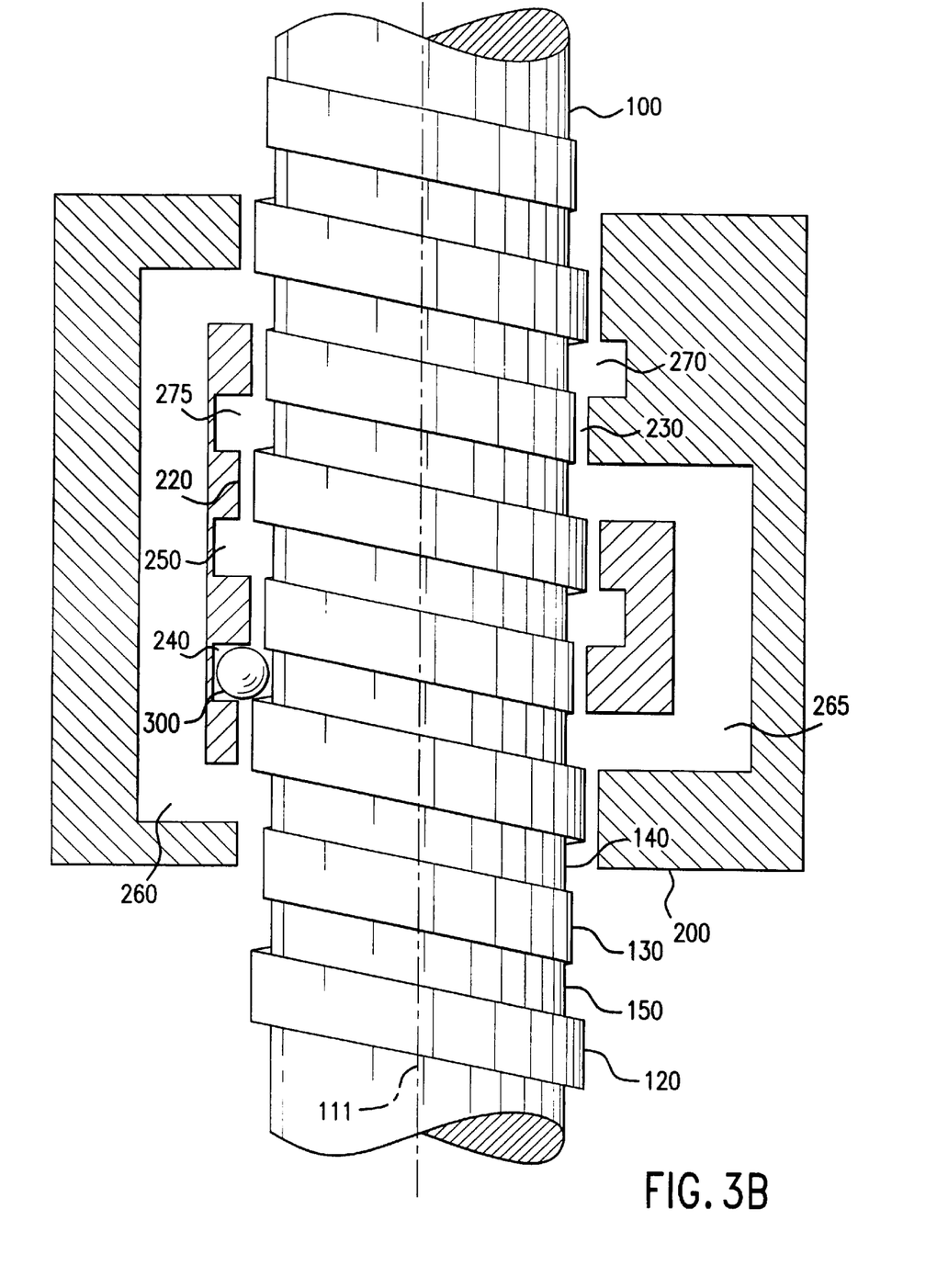
Figure 3C:
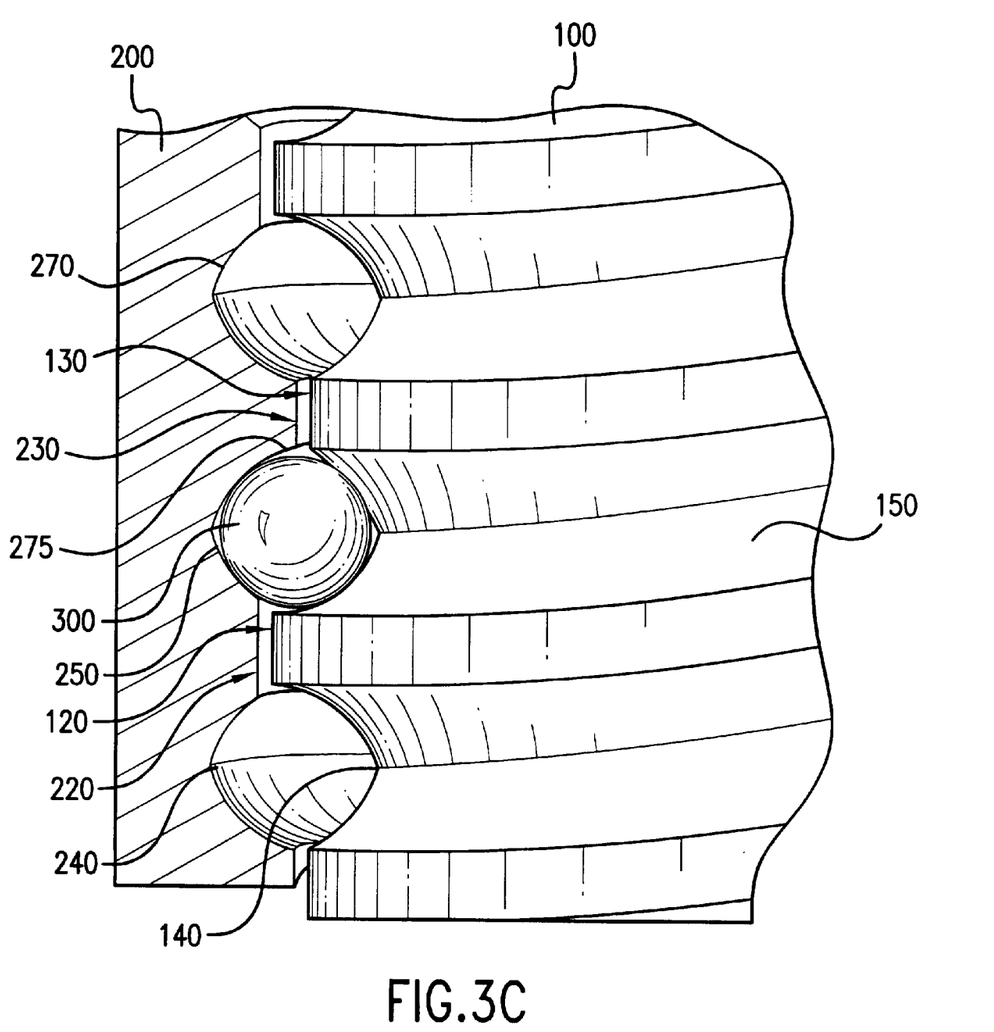

Referring to FIGS. 3A–3C, a fail-safe ball screw assembly is shown including an elongated linear ball screw 100 and a ball nut 200. The screw 100 has a cylindrical screw shaft 110 with having a center axis 111 and an outer peripheral surface 112. The outer surface 112 has two separate, intertwined helical ridges 120 and 130 that extend for substantially the entire length of the shaft 110. The first ridge 120 extends further away from the axis 111 of the screw shaft than the second screw ridge 130. Both ridges 120 and 130 generally have the same pitch and generally are positioned out of phase with each other by approximately 180° so that the two ridges 120 and 130 are spaced by half their pitch. In this way, a point on one turn of one ridge lies halfway between the corresponding points of an adjacent turn of the other ridge. However, it should be appreciated that it is known in the art and anticipated by the present invention to employ an alternative screw shaft 110 having ridges 120 and 130 of different pitches and position or ridges 120 and 130 having pitches that vary along the length of the shaft 110. One possible alternative configuration is provided below.

The screw ridges 120 and 130 define two separate, intertwined helical grooves 140 and 150 on the shaft surface 112. The screw grooves 140 and 150 are formed in the valleys between the screw ridges 120 and 130, so the screw grooves, 140 and 150 have similar pitch and positioning to the screw ridges 120 and 130. The grooves 140 and 150, therefore, generally have the same pitch and are positioned out of phase with each other by approximately 180° so that the two grooves 140 and 150 are spaced by half their pitch.

The nut 200 is positioned to surround and mate with the screw 100. The nut has a cavity through which the screw shaft 110 extends. At the interface with screw shaft 110, the nut 200 has an inner peripheral surface 210. Similar to the screw shaft 100, the inner peripheral surface 210 has two separate, intertwined helical ridges 220 and 230, with the second nut ridge 230 extending relatively further than the first nut ridge 220. The nut ridges 220 and 230 are adapted to be placed in close proximity with the screw ridges 120 and 130. In particular, the first screw and nut ridges 120 and 220 are paired together, and the second screw and nut ridges 130 and 230 are paired together. Accordingly, the nut ridges 220 and 230 have a substantially similar positioning and pitch to the screw ridges 120 and 130, i.e., the nut ridges 220 and 230 typically have the same pitch and are positioned out of phase with each other by approximately 180° so that the two nut ridges 220 and 230 are spaced apart by half their pitch. The nut ridges 220 and 230 likewise define two separate, intertwined helical grooves 240 and 250 on the inner peripheral nut surface 210. The nut grooves 240 and 250 are formed in the valleys between the nut ridges 220 and 230, so the nut grooves 240 and 250 have similar pitch and positioning to the nut ridges.

The nut grooves 240 and 250 are paired with the screw grooves 140 and 150 to form two channels 270 and 275 through which a multitude of bearings 300 travel. The ends of the nut grooves 240 and 250 on the interior 210 of the nut 200 are typically connected by return tubes 260 and 265 formed in the nut 200. Thus, the channels 270 and 275 and the return tubes 260 and 265 combine to form a pair of endless recirculating paths for the bearing balls 300 that are disposed between the nut 200 and shaft 100. During normal operation, the bearings 300 position the screw 100 and the nut 200 so they do not come into contact. The bearings 300 in the channels 270 and 275 bear the load of the nut 200, while those in the return tube 260 and 265 are in a nonloaded state. The bearings 300 allow relative rotation between the nut 200 and shaft 100 just as in a conventional ball screw assembly. In particular, if the shaft 100 is held linearly fixed but free to rotate, linear movement of the nut 200 along the shaft 100 will cause the shaft 100 to rotate. Similarly, if the nut 200 is held linearly fixed, linear movement of the shaft 100 will cause the nut 200 to rotate.

In an alternative embodiment, the spacings between the screw ridges 120 and 130 and, likewise, the spacings between the nut ridges 220 and 230 vary such that one of the channels, either 260 or 265, is substantially smaller. In this embodiment, the ball screw assembly may be adapted to use the bearings 300 in only one of the channels. Alternatively, larger bearings may be used in the larger channel, and small bearings may be used in the other, smaller channel.

The screw 100 and nut 200 are generally made from a metal, such as aluminum, bronze, iron or steel, but may alternatively be formed from numerous alternative materials or combination of materials as needed for particular applications. For example, ball screw assemblies in low-cost applications with small loads may be composed from plastics. Likewise, ball screw assemblies used in corrosive environments may be formed from titanium.

The screw 100 and nut 200 are formed using known techniques, depending on the composition of the components and the eventual application for the ball screw assembly. Typical construction methods include forging, casting, milling, lathing, routing, mold injection or machining. In one embodiment, the screw ridges 120 and 130 are originally formed to have similar physical dimensions of height and width, and then the second ridge 130 is shaved, i.e., a top portion of the ridge 130 is removed. In this way, the second ridge 130 becomes relatively more shallow than the first ridge 120. Since the screw ridges 120 and 130 typically taper away from the shaft axis 111 in order to define screw grooves 140 and 150 that are approximately circular, this construction results in the second screw ridge 130 being relatively wider at its top than the first screw ridge 120. Likewise, the nut is formed in this embodiment by forming two physically similar, distinct ridges and then shaving down one of the ridges to form a first nut ridge 220 that is relatively more shallow and wider than the second nut ridge 230.

The bearings 300 are typically made from metals, such as iron, aluminum, or steel. Alternatively, the bearings 300 may be composed instead from a variety of alternative materials, such as plastics or ceramics.

The bearings 300 are generally balls having a substantially round shape. It is also known to use non-round bearings, depending on the needs of the application. Other possible configurations for the bearings 300 include cylinders, cones, ovals, etc. The only limitation for the physical configuration for the bearings 300 is that they must be able to rotate and travel freely through the channels 270 and 275 in response radial motion of the ball screw 100 relative to the nut 200 in order to perform the above described function of dispersing the forces acting between the screw and nut.

Returning to the screw ridges 120 and 130 and the nut ridges 220 and 230, the extended flats of first screw ridge 120 and the second nut ridge 230 are generally separated by the bearings 300 positioned in the channels 260 and 265 between the screw and nut ridges. Accordingly, there is little contact between the screw 100 and the nut 200 during the normal operation of the screw assembly. This configuration allows the ball screw assembly to operate smoothly, with little force required to rotate the screw relative to the nut.

Figure 3D:
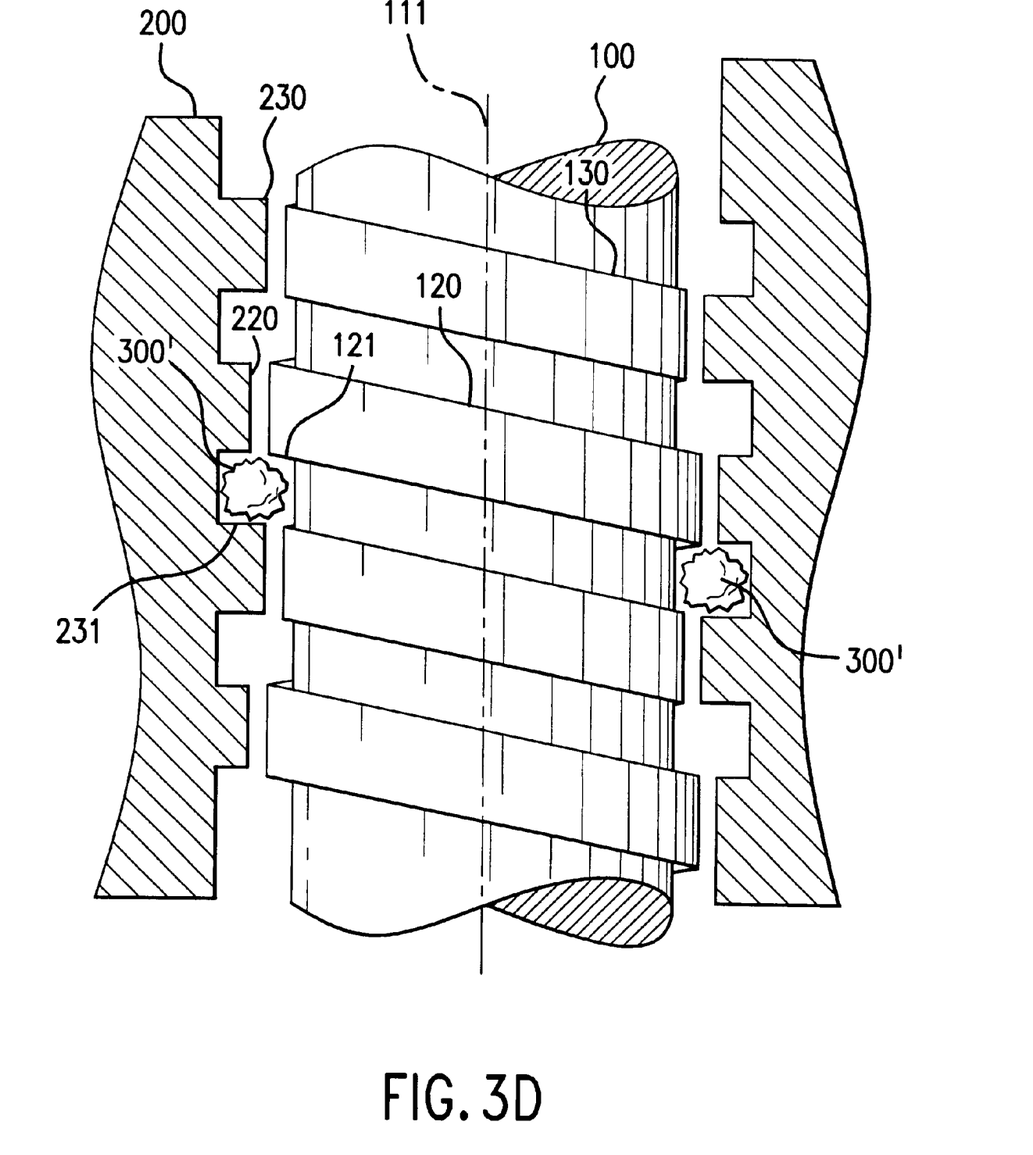

As previously described, the bearings 300 may deteriorate after repeated use of the ball screw assembly. This deterioration of the bearings 300 is detrimental to the operation of the ball screw assembly because the worn bearings do not properly dissipate the forces between the screw 100 and the nut 200. However, the ball screw assembly of the present invention minimizes the harmful results from the deterioration of the bearings 300. FIG. 3D illustrates that worn bearings 300' continue to disperse the forces between the screw 100 and nut 200. The worn bearings 300', even after significant deterioration, remain in one of the channels 270 and 275 formed by the overlapping, extended vertical flats in the screw and the nut, respectively 121 and 231. As a result, the worn bearings 300' continue to function as a barrier between the screw and nut to accept and dissipate forces between the vertical flats 121 and 231. However, the ball screw assembly becomes less efficient as the bearings 300 deteriorate because the bearings 300 become less able to turn smoothly. More force is required to rotate the ball screw relative to the nut. The implication of this aspect of the present invention is discussed in greater detail below.

Figure 3E:
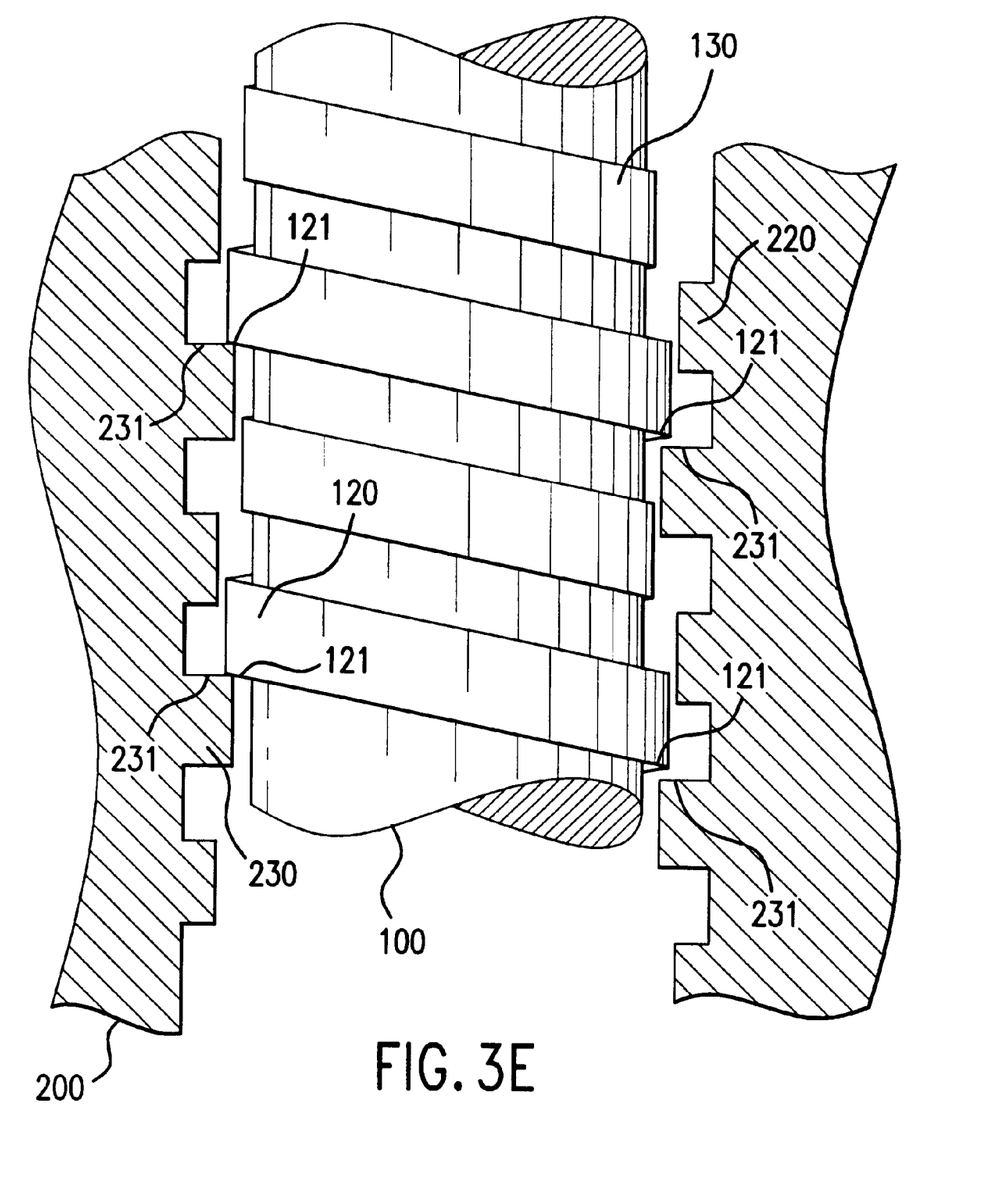

As the bearings 300 become extremely worn or are lost from the ball screw assembly, any axial force, such as the weight of a load supported by the ball screw assembly, causes the screw 100 to move relative to the nut 200. The movement continues until the overlapping vertical flats 121 and 231 come into contact because the first screw vertical flat 121 and second nut vertical flat 231 overlap, as illustrated in FIG. 3E. The contact between the overlapping vertical flats 121 and 231 prevents the separation of the screw 100 from the nut 200. As a result, any load born by the ball screw assembly is not dropped after the loss or deterioration of the bearings 300. However, contact between the vertical flats 121 and 231 increases the force required to the turn the ball screw relative to the nut because the bearings 300 are no longer present to smooth the interaction between the screw and nut. As a result, more force is required to rotate the ball screw relative to the nut once the bearings 300 are lost from the ball screw assembly.

Figure 4:
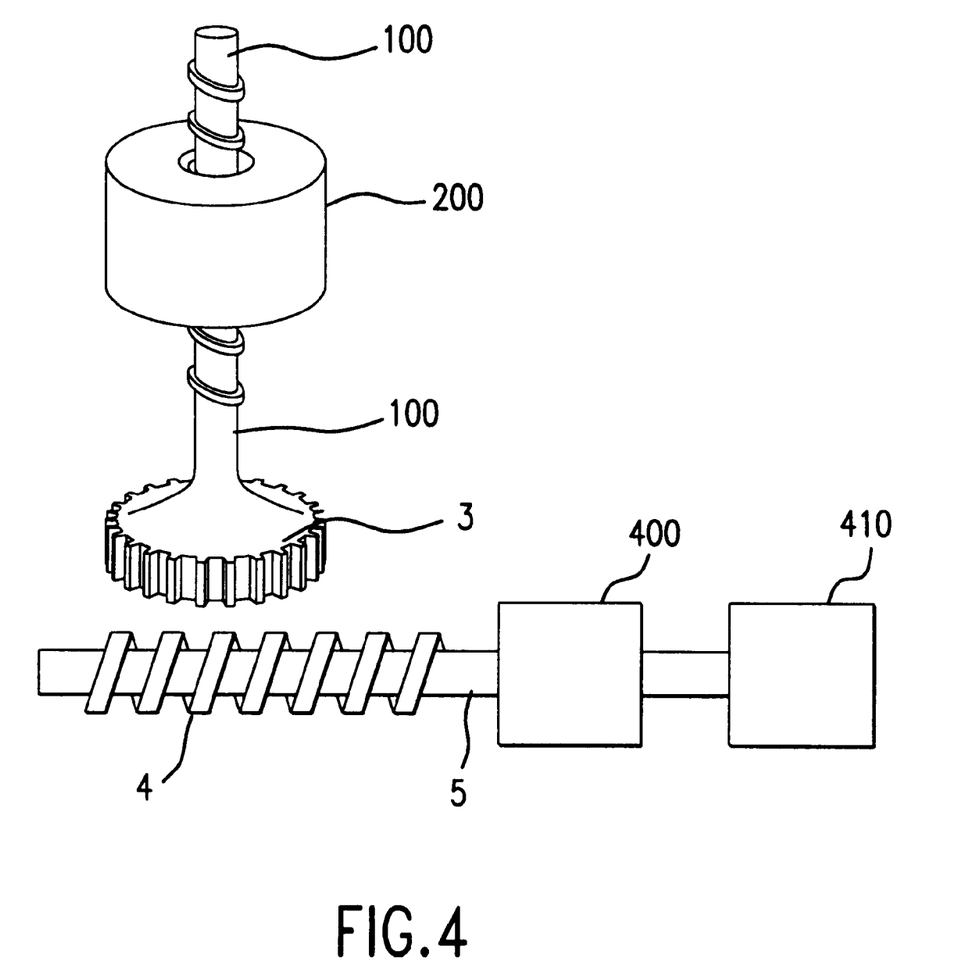
FIG. 4 is a schematic diagram of a catastrophic failure detection system employing the fail-safe ball screw assembly of FIGS. 3A–3D.

Eventually, the ball screw assembly may deteriorate such that the ball screw can no longer rotate relative to the nut. Alternatively, the overlap between the vertical flats 121 and 231 may be able to support to bear a heavy load for a only short period. In either case, it would be advantageous to be able to monitor the status of the ball screw assembly to identify a ball screw assembly in the process of failing. As described above, the ball screw assembly of the present invention continues to operate during the various stages of failure, but requires increasingly more force to rotate the ball screw relative to the nut. Accordingly, the failure of the ball screw assembly of the present invention may be detected by connecting a torque sensor 400 to the ball screw assembly, as illustrated in FIG. 4. Torque sensors are well-known devices used to detect the amount of force being applied at any instant. The torque sensor 400 may display the amount of the force being applied at any time. For example, a simple mechanical torque sensor measures the amount of bending in a force-applying lever, such as a ratchet, and uses this distance as a measure of the amount of force being applied. In a preferred embodiment of the present invention, a torque sensor is attached to a motor 410 that turns the ball screw 100 relative to the nut 200. For example, commercially available torque sensors produced by Siemens AG may be used in this capacity. In the FIG. 4, the motor 410 drives a worm shaft 5 connected to a worm gear 4. Rotation of the worm gear 4 is in mesh with a pinion gear 3 connected to the screw 100. The torque sensor 400 may also have a programmable maximum force. If the amount of the force needed to turn the ball screw 100 relative to the nut 200 exceeds the maximum programmed amount, the torque sensor may emit some type of warning signal, such as an audible alarm, or a signal that stops the motor from applying additional force to the ball screw assembly. Overall, detection of a failing ball screw assembly allows repair or replacement of the failing ball screw before the occurrence of catastrophic failure.

The invention having been described, it will be apparent to those skilled in the art that the same may be varied in many ways without departing from the spirit and scope of the invention. Any and all such modifications are intended to be included within the scope of the following claims. For example, although the above description refers to a ball-screw having two start grooves, the number of grooves according to the present invention may be increased by providing three grooves on the screw shaft, three corresponding grooves on the interior of the nut, and three return channels to define three recirculating paths.

What is claimed is:

1. A ball screw assembly comprising:
   a screw shaft having an outer peripheral surface including a helical first screw ridge and a helical second screw ridge, the first and second screw ridges being intertwined to form helical screw grooves, the first screw ridge extending relatively further away from a center axis of the screw shaft than the second screw ridge;
   a nut positioned around the screw shaft, the nut having an inner peripheral surface with a helical first nut ridge and a helical second nut ridge, the first and second nut ridges being intertwined to form helical screw grooves, the second nut ridge extending relatively closer to the center axis of the screw shaft than the first nut ridge, the nut grooves opposed to the screw grooves, the first nut ridge opposed to the first screw ridge, the second nut ridge opposed to the second screw ridge; and
   a plurality of bearings that are interposed between the screw grooves and nut grooves,
   wherein, following of the bearings from the apparatus, axial motion of the screw shaft relative to the nut is limited by an overlap of the extended first screw ridge and the extended second nut ridge.

2. The ball screw assembly of claim 1, wherein the first screw ridge extends for a substantial length of the screw shaft.

3. The ball screw assembly of claim 1, wherein the second screw ridge extends for a substantial length of the screw shaft.

4. The ball screw assembly of claim 1, wherein the first and second screw ridges have an equal pitch.

5. The ball screw assembly of claim 4, wherein the first and second screw ridges are positioned out of phase with each other by approximately 180° so that the two nut ridges are spaced apart by half their pitch.

6. The ball screw assembly of claim 1, wherein the two nut ridges are positioned out of phase with each other by approximately 180° so that the two nut ridges are spaced apart by half their pitch.

7. The ball screw assembly of claim 1 wherein the nut further comprises return tubes that combine with the screw grooves and the nut grooves to form distinct, endless passageways.

8. A ball screw assembly of claim 1, further comprising a torque sensor connected to the ball screw assembly to detect the amount of force required to cause a radial motion of the screw shaft relative to the nut.

9. A ball screw assembly comprising:
- a nut having a plurality of grooves on an inner peripheral surface, the inner peripheral surface defining a cavity;
- a screw shaft having a plurality of grooves on an outer peripheral surface, the screw shaft extending through the cavity, the screw grooves combining the nut grooves to form at least two separate helical channels extending along said screw shaft so as to be out of phase with each other; and
- a plurality of bearings in each of the two channels.

10. The ball screw assembly of claim 9 wherein the nut further comprises at least one return tube that combines with at least one of said channels to form at least one endless passageway for the bearings.

11. A ball screw assembly of claim 9, further comprising a torque sensing means connected to the ball screw assembly to detect the amount of force required to cause a radial motion of the screw shaft relative to the nut.

12. A ball screw assembly comprising:
- a double start screw with a first screw helix with a truncated, smaller diameter flat and an intertwined second screw helix with an extended, larger diameter flat; and
- a corresponding nut with a first nut helix with an extended, larger diameter flat and an intertwined second nut helix with a truncated, smaller diameter flat,
- wherein insertion of the screw into the nut causes the first screw helix is paired with the first nut helix and the second screw helix is paired with the second nut helix to combine to form channels in which plurality of bearings travel.

13. A ball screw assembly of claim 12, further comprising a torque sensing means connected to the ball screw assembly to detect the amount of force required to cause a radial motion of the screw shaft relative to the nut.

* * * * *